(12) United States Patent
Seki

(10) Patent No.: US 7,858,065 B2
(45) Date of Patent: Dec. 28, 2010

(54) PROCESS FOR PRODUCING SUPPORTED RUTHENIUM AND PROCESS FOR PRODUCING CHLORINE

(75) Inventor: Kohei Seki, Niihama (JP)

(73) Assignee: Sumitomo Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/094,506

(22) PCT Filed: Nov. 30, 2006

(86) PCT No.: PCT/JP2006/024389

§ 371 (c)(1),
(2), (4) Date: May 28, 2008

(87) PCT Pub. No.: WO2007/064027

PCT Pub. Date: Jun. 7, 2007

(65) Prior Publication Data

US 2008/0299032 A1  Dec. 4, 2008

(30) Foreign Application Priority Data

Nov. 30, 2005  (JP) ............................ 2005-345222

(51) Int. Cl.
*C01B 7/01* (2006.01)
(52) U.S. Cl. .......................... 423/502; 423/491; 502/20
(58) Field of Classification Search ............... 502/20, 502/30, 35; 423/491, 502
See application file for complete search history.

(56) References Cited

U.S. PATENT DOCUMENTS

| 5,871,707 A | 2/1999 | Hibi et al. |
| 5,908,607 A * | 6/1999 | Abekawa et al. ............ 423/502 |

| 2002/0028173 A1 | 3/2002 | Hibi et al. |

FOREIGN PATENT DOCUMENTS

| EP | 0 743 277 A1 | 11/1996 |
| JP | 58-19475 A | 11/1983 |
| JP | 61-6131 A | 1/1986 |
| JP | 62-96322 A | 5/1986 |
| JP | 62-256930 A | 11/1986 |
| JP | 62256931 A * | 11/1987 |
| JP | 62-287025 A | 12/1987 |
| JP | 3-21490 B2 | 3/1991 |
| JP | 9-142806 A | 6/1997 |
| JP | 2002-79093 A | 3/2002 |
| JP | 3284879 B2 | 5/2002 |
| JP | 2004-181408 A | 7/2004 |
| WO | 2004/026761 A1 | 4/2004 |

OTHER PUBLICATIONS

Zhu Hongfa, "Preparation and Application Technology of Catalyst Supports," Petroleum Industry Press, Dec. 2002.

* cited by examiner

*Primary Examiner*—Scott Kastler
*Assistant Examiner*—Brian Walck
(74) *Attorney, Agent, or Firm*—Sughrue Mion, PLLC

(57) ABSTRACT

The present invention provides a process for producing supported ruthenium, which comprises recovering a ruthenium compound from supported ruthenium used as a catalyst in production of chlorine by oxidation of hydrogen chloride with oxygen, and supporting the ruthenium compound on a carrier; and a process for producing chlorine, which comprises producing a supported ruthenium catalyst by the process mentioned above and oxidizing hydrogen chloride with oxygen in the presence of the supported ruthenium.

3 Claims, No Drawings

PROCESS FOR PRODUCING SUPPORTED RUTHENIUM AND PROCESS FOR PRODUCING CHLORINE

TECHNICAL FIELD

The present invention relates to a process for producing supported ruthenium, in which a ruthenium component, such as a ruthenium compound and metallic ruthenium, is supported on a carrier. The present invention also relates to a process for producing chlorine, by oxidizing hydrogen chloride with oxygen using as a catalyst the supported ruthenium produced by the process.

BACKGROUND ART

Supported ruthenium in which a ruthenium component, such as a ruthenium compound and metallic ruthenium, is supported on a carrier is preferably used as a catalyst in production of chlorine, due to its high catalytic activity on oxidation of hydrogen chloride with oxygen (see, for example, EP0743277A1, U.S. Pat. No. 5,908,607, EP936184A2 and US2002/0028173). However, since the ruthenium compound as a raw material is expensive and also its catalytic activity is gradually deteriorated by sintering of the ruthenium component and the like during its use, to finally result in necessity of its exchange, reduction in catalyst cost in production of chlorine using supported ruthenium as a catalyst becomes an important problem.

As one solution for reducing the catalyst cost, by improving durability of catalytic activity (i.e., catalyst life) of supported ruthenium, extension of period of from start of use of the catalyst to its exchange is exemplified. For example, JP-A-2002-79093 (WO2001/010550) proposes improvement of catalyst life of supported ruthenium oxide by using, as a carrier, titanium oxide calcined at 550° C. or more and having a rutile crystal structure. Moreover, JP-A-2004-181408 proposes improvement of catalyst life of supported ruthenium oxide by controlling the specific surface area of the supported ruthenium oxide to from 13 to 16 $m^2/g$.

DISCLOSURE OF THE INVENTION

However, it cannot be denied that there is a limitation to improvement of catalyst life of the supported ruthenium, such as those disclosed in JP-A-2002-79093 (WO2001/010550) and JP-A-2004-181408. Therefore, the present inventors have studied extensively in order to reduce the catalyst cost in production of chlorine using the supported ruthenium as a catalyst from a viewpoint different from improvement of catalyst life, and as a result, the inventors have found that supported ruthenium can be produced at low cost by recovering a ruthenium compound from the supported ruthenium which has been used as a catalyst in the production of chlorine and reusing the ruthenium compound in production of the supported ruthenium, and that chlorine can be produced at low cost by reusing the resulting supported ruthenium as a catalyst in the production of chlorine, and the present invention has been completed.

That is, the present invention provides a process for producing supported ruthenium, which comprises recovering a ruthenium compound from supported ruthenium used as a catalyst in production of chlorine by oxidation of hydrogen chloride with oxygen, and supporting the ruthenium compound on a carrier.

In addition, according to the present invention, a process for producing chlorine, which comprises producing a supported ruthenium catalyst by the process mentioned above and oxidizing hydrogen chloride with oxygen in the presence of the supported ruthenium, is also provided.

According to the present invention, supported ruthenium can be produced at low cost, and chlorine can be produced at low cost by using the thus obtained supported ruthenium as a catalyst.

MODE FOR CARRYING OUT THE INVENTION

The supported ruthenium as a subject of the present invention is one in which a ruthenium component is supported on a carrier, and the ruthenium component may be a ruthenium compound or metallic ruthenium, or may be used in combination of a ruthenium compound with metallic ruthenium. In the case where the ruthenium component is a ruthenium compound, examples thereof include oxides or hydroxides, such as $RuO_2$, $RuO(OH)$, $RuO(OH)_2$, $Ru(OH)_3$ and $Ru(OH)_4$; halides, such as $RuCl_3$ and $RuBr_3$; oxoacid salts, such as $K_2RuO_4$; oxyhalides, such as $Ru_2OCl_4$, $Ru_2OCl_5$ and $Ru_2OCl_6$; and nitrosyl complexes, such as $K_2[RuCl_5(NO)]$, $[Ru(NH_3)_5(NO)]Cl_3$, $[Ru(OH)(NH_3)_4(NO)](NO_3)_2$ and $[Ru(NO)](NO_3)_3$. Among them, a supported ruthenium oxide in which the oxide is supported on a carrier is suitable for the subject of the present invention. Moreover, as the ruthenium compound, its hydrate may be used according to necessity, and may also be used in combination of two or more thereof.

Examples of the carrier include oxides or composite oxides of an element selected from aluminum, silicon, titanium, zirconium and niobium, and active carbons, and may be optionally used in combination of two or more thereof. Among them, alumina, silica, titanium oxide, or zirconium oxide are preferably used, and titanium oxide having a rutile crystal structure is particularly preferably used.

Supported ruthenium compound in which a ruthenium compound is supported on a carrier can be produced, for example, by a method of impregnating a carrier with a solution of a ruthenium compound, a method of dipping a carrier in a solution of a ruthenium compound so that the ruthenium compound is adsorbed on the carrier, and the like. Further, as disclosed in, for example, EP936184A2, US2002/0028173 and JP-A-2002-79093 (WO2001/010550), supported metallic ruthenium in which metallic ruthenium is supported on a carrier can be suitably produced by reducing a supported ruthenium compound.

Moreover, supported ruthenium oxide in which ruthenium oxide is supported on a carrier can be suitably produced by calcining a supported ruthenium compound other than the supported ruthenium oxide or supported metallic ruthenium under an atmosphere of an oxygen-containing gas, and can be produced more suitably by calcining supported halogenated ruthenium in which a halide as a ruthenium compound, especially chloride, is supported on a carrier, under an atmosphere of an oxygen-containing gas. Here, as the oxygen-containing gas, air may be used or pure oxygen may be used. In addition, these gases may be used after being optionally diluted with an inert gas such as nitrogen and helium, and in such a case, it is preferable that the oxygen concentration be 5% or more by volume. The calcination temperature is usually from 100 to 500° C., preferably from 200 to 400° C. In addition, the calcination time is usually about from 1 to 50 hours.

The weight ratio of ruthenium component/carrier in the supported ruthenium is usually from 0.1/99.9 to 20/80, preferably from 0.5/99.5 to 15/85. The use ratio of the ruthenium compound and the carrier as raw materials may be adjusted so that it is within such a range. If the ruthenium component is present in too little amount, catalyst activity is sometimes not enough, and if the ruthenium component is present in too much amount, disadvantages arise in cost. In addition, in the case where the ruthenium compound is ruthenium oxide, the oxidation number of the ruthenium in the ruthenium oxide is preferably +4, and the preferable ruthenium oxide is ruthenium dioxide ($RuO_2$), and it may contain the other ruthenium having a different oxidation number or the other ruthenium oxide of different forms.

The supported ruthenium thus produced shows high activity as a catalyst for producing chlorine by oxidation of hydrogen chloride with oxygen. This oxidation reaction can be suitably carried out through continuous reaction by making a supported ruthenium catalyst exist in a fixed bed or a fluidized bed of a reactor, supplying a raw material gas containing hydrogen chloride and oxygen thereto and withdrawing the generated chlorine-containing gas.

The reaction temperature in this oxidation reaction is usually from 100 to 500° C., preferably from 200 to 450° C. The reaction pressure is usually about from 0.1 to 5 MPa. As an oxygen source, air may be used, or pure oxygen may be used. The theoretical molar amount of oxygen to hydrogen chloride is ¼ mole, but oxygen is usually used in a from 0.1 to 10-fold amount based on the theoretical amount. In addition, the supply rate of hydrogen chloride is usually about from 10 to 20000 $h^1$ expressed in terms of a gas supply rate per 1 liter of the catalyst (L/h; 0° C., 1 atm calculated), i.e. GHSV.

As mentioned above, if chlorine is produced using a supported ruthenium as a catalyst, the catalytic activity of the supported ruthenium is gradually deteriorated along with progress of operation time, due to sintering of the ruthenium component and the like. In addition, by operation mistakes or machinery malfunction during the operation, the supported ruthenium may be irreversibly poisoned to become unreproducible, and change in its physical form may occur and cause an accident that a remarkable pressure loss arises in a catalyst layer. Moreover, although the supported ruthenium which became impossible to maintain a predetermined catalyst performance in this way is needed to be treated as a waste catalyst and to be replaced with a new one, it is very effective from a viewpoint of cost to recover and reuse the catalyst because the expensive ruthenium component is contained in this waste catalyst. Therefore, in the present invention, ruthenium compounds are recovered from the supported ruthenium used in production of chlorine as a catalyst, and those are reused in production of supported ruthenium. In this way, by using cheap ruthenium materials derived from a spent catalyst, the supported ruthenium can be produced at low cost.

In addition, since the commercially available ruthenium compounds are not only expensive, but they may contain impurities of metallic component etc, such as each components of rhodium, palladium, iridium, platinum, gold, sodium, magnesium, aluminum, silicon, calcium, iron, copper and zinc, depending on the origin of the raw materials, or a production method or a purification method, the performance as a catalyst for production of chlorine may not be fully obtained depending on the kind or quantity of such impurities when the supported ruthenium is produced using these ruthenium compounds. For this reason, in the production of the supported ruthenium with use of the commercially available ruthenium compound, various standard analyses may become necessary and further purification may be needed, in order to strictly control the impurities contained in the ruthenium compounds. To the contrary, in the case where a ruthenium compound is recovered from a waste catalyst which has had achievements having a sufficient performance as a catalyst for production of chlorine and a supported ruthenium is produced using it, the strict control can be omitted to make it possible to easily and stably produce supported ruthenium because it can be convinced with considerable accuracy that the recovered ruthenium compound fulfills the predetermined standard concerning impurities if contamination of impurities be avoided during the recovery procedure. Moreover, this point is the same as compared to the case where a ruthenium compound is recovered from ruthenium materials other than the supported ruthenium which has been used for production of chlorine, for example, electronic materials such as thin film electrodes of electron devices, and functional materials such as catalysts other than those for production of chlorine and a supported ruthenium is produced using it; and strict control of impurities is needed for these ruthenium materials recovered therefrom because the above metallic components are intentionally used as a common component in many cases in these ruthenium materials.

Referring to recovery of a ruthenium compound from supported ruthenium, as disclosed in JP-A-58-194745, JP-A-61-6131, JP-A-62-96322, JP-A-62-256930, JP-A-62-287025, etc., known methods for recovery of ruthenium can be applied. A metallic ruthenium may be recovered, and subsequently be converted into a ruthenium compound. And, the recovered ruthenium compound may be converted into another ruthenium compound via metallic ruthenium as occasion demands. Further, as for the ruthenium compound to be recovered in this way, it is preferably a halide, and especially preferably a chloride.

For example, when the method disclosed in JP-A-58-194745 is applied, using supported metallic ruthenium as it is or after a supported ruthenium compound is reduced to convert the ruthenium component into metallic ruthenium, the metallic ruthenium may be then eluted from a carrier as an alkali ruthenate in an alkali solution containing a chlorine gas or an oxidative chlorine compound. Subsequently, while heating the solution of the alkali ruthenate thus obtained, a chlorine gas is blown thereinto to oxidatively evaporate the ruthenium to be absorbed in hydrochloric acid, and then this solution is concentrated to dryness to obtain ruthenium chloride.

When the method disclosed in JP-A-61-6131 is applied, using supported ruthenium oxide as it is, or after a supported ruthenium compound other than supported ruthenium oxide, or supported metallic ruthenium is oxidatively burnt to convert the ruthenium component into ruthenium oxide; it is heated with concentrated sulfuric acid to convert the carrier (oxides) into its sulfate, subsequently dissolved in dilute sulfuric acid, and the ruthenium oxide can be separated and recovered. Then, the resulting ruthenium oxide is treated in the order of reduction into metallic ruthenium, elution as alkali ruthenate, oxidative evaporation, absorption into hydrochloric acid, and concentration to dryness, according to the method disclosed in JP-A-58-194745 mentioned above, thereby to obtain ruthenium chloride.

When the method disclosed in JP-A-62-96322 is applied, while supported ruthenium is heated in the presence of carbon, a chlorine gas is introduced thereto to convert the carrier (oxides) into a chloride, and the chloride can be separated through evaporation. Then, the resulting metallic ruthenium is treated in the order of elution as alkali ruthenate, oxidative evaporation, absorption into hydrochloric acid, and concentration to dryness, according to the method disclosed in JP-A-58-194745 mentioned above, thereby to obtain ruthenium chloride.

When the method disclosed in JP-A-62-256930 is applied, ruthenium chloride can be obtained by introducing a chlorine gas into supported ruthenium while being heated in the presence of carbon or carbon monoxide to convert the carrier (oxides) into a chloride and convert the ruthenium component into ruthenium chloride, and separating both by a difference in vapor pressure. Moreover, the publication discloses that this ruthenium chloride is heated while introducing an inert gas to release metallic ruthenium, and ruthenium chloride with a higher purity can be obtained by treating the thus obtained metallic ruthenium in the order of elution as alkali ruthenate, oxidative evaporation, absorption into hydrochloric acid, and concentration to dryness, according to the above-mentioned method disclosed in JP-A-58-194745.

When the method disclosed in JP-A-62-287025 is applied, supported ruthenium is oxidatively burnt, and then is melted with alkali hydroxide, followed by extraction with an aqueous alkali hydroxide solution containing free chlorine. Then, ruthenium chloride can be obtained by treating the thus obtained solution of alkali ruthenate in the order of oxidative evaporation, absorption into hydrochloric acid, and concentration to dryness according to the above-mentioned method disclosed in JP-A-58-194745.

As described above, the supported ruthenium can be produced at low cost by supporting the ruthenium compound recovered in this way on a carrier. More specifically, as mentioned above, the supported ruthenium compound can be produced, for example, by the method of impregnating the carrier with a solution of the ruthenium compound, or the method of dipping the carrier in a solution of the ruthenium compound so that the ruthenium compound is adsorbed on the carrier, or the like. In addition, the supported metallic ruthenium can be suitably produced by reducing the supported ruthenium compound. Furthermore, the supported ruthenium oxide can be produced suitably by calcining a supported ruthenium compound or supported metallic ruthenium other than the supported ruthenium oxide under an atmosphere containing an oxygen gas. Moreover, it is not necessary that all of the ruthenium compounds as a raw material are the recovered ruthenium compounds, but when such a ratio is too low, the effect of the present invention is impaired. Therefore, it is desirable to maintain the ratio at 30% or more, preferably 50% or more, based on the total weight of the ruthenium compound as a raw material.

Further, as described above, chlorine can be produced at low cost by using the thus obtained supported ruthenium as a catalyst for oxidation of hydrogen chloride with oxygen. Moreover, similarly as above, it is not necessary that all of the supported ruthenium as the catalyst is supported ruthenium which has been produced using the recovered ruthenium compound as a raw material, but when such a ratio is too low, the effect of the present invention is impaired. Therefore, it is desirable to maintain the ratio at 30% or more, preferably 50% or more, based on the total weight of the supported ruthenium as the catalyst.

EXAMPLES

The following Examples will illustrate the present invention but are not to be construed to limit the scope of the present invention. In the Examples, parts and % showing the amount used and content are expressed in terms of weight basis, unless otherwise specifically stated.

(a-1) Preparation of Catalyst-1

Thirty four (34) parts of titanium oxide (STR-60R,100% rutile type, manufactured by Sakai Chemical Industry Co., Ltd.) and 66 parts of α-alumina (AES-12, manufactured by Sumitomo Chemical Company, Limited) were mixed and then pure water was added thereto and the mixture was kneaded. The kneaded product was extruded into a cylindrical form of 1.5 mmφ diameter, dried, and then crushed to about from 2 to 4 mm in length. The resulting molded product was calcined in air at about 600° C. for 3 hours to obtain a carrier comprising a mixture of titanium oxide and α-alumina. This carrier was impregnated with an aqueous solution of a commercially available ruthenium chloride hydrate, dried, and then calcined in air at 250° C. for 2 hours to obtain supported ruthenium oxide wherein ruthenium oxide was supported on the above carrier in a supporting rate of 1%, and this was served as Catalyst-1.

(a-2) Preparation of Catalyst-2

Thirty four (34) parts of titanium oxide (STR-60R,100% rutile type, manufactured by Sakai Chemical Industry Co., Ltd.) and 66 parts of α-alumina (AES-12, manufactured by Sumitomo Chemical Company, Limited) were mixed and then pure water was added, and the mixture was kneaded. The kneaded product was extruded into a cylindrical form of 1.5 mmφ in diameter, dried, and then crushed to about from 2 to 4 mm in length. The resulting molded product was calcined in air at from 700 to 730° C. for 3 hours to obtain a carrier comprising a mixture of titanium oxide and α-alumina. This carrier was impregnated with an aqueous solution of a commercially available ruthenium chloride hydrate, dried, and calcined in air at 250° C. for 2 hours to obtain supported ruthenium oxide wherein ruthenium oxide was supported on the above carrier in a supporting rate of 2%, and this was served as Catalyst-2.

(a-3) Preparation of Catalyst-3

Fifty (50) parts of titanium oxide (STR-60R, 100% rutile type, manufactured by Sakai Chemical Industry Co., Ltd.) and 50 parts of α-alumina (AES-12, manufactured by Sumitomo Chemical Company, Limited) were mixed, and the mixture and 12.8 parts of titanium oxide sol (CSB, manufactured by Sakai Chemical Industry Co., Ltd., and containing titanium oxide in 39%) based on 100 parts of the mixture were diluted with pure water, and kneaded. The kneaded product was extruded into a cylindrical form of 1.5 mmφ in diameter, dried, and then crushed to about from 2 to 4 mm in length. The resulting molded product was calcined in air at from 650 to 680° C. for 3 hours to obtain a carrier comprising a mixture of titanium oxide and α-alumina. This carrier was impregnated with an aqueous solution of a commercially available ruthenium chloride hydrate, dried, and calcined in air at 250° C. for 2 hours to obtain a supported ruthenium oxide wherein ruthenium oxide was supported on the above carrier in a supporting rate of 4%, and this was served as Catalyst-3.

(b) Evaluation of Catalyst-3

One gram (1.0 g) of the Catalyst-3 prepared in the above (a-3) was diluted with 12 g of α-alumina spheres having a diameter of 2 mm (SSA995, manufactured by Nikkato Corp.), the diluted product was filled into a nickel reaction tube (inside diameter 14 mm), and 12 g of the same α-alumina spheres was further filled up at the side of a gas inlet of the reaction tube as a preheating layer. Into this tube were supplied a hydrogen chloride gas at a rate of 0.214 mol/h (4.8 L/h, 0° C., 1 atm calculated) and an oxygen gas at a rate of 0.107 mol/h (2.4 L/h, 0° C., 1 atm calculated) under normal pressure, and the catalyst layer was heated at from 282 to 283° C. to perform the reaction. One and half (1.5) hours after beginning of the reaction, the gas at an outlet of the reaction tube was sampled by passing it through a 30% aqueous potassium iodide solution for 20 minutes, and then the amount of chlorine produced was determined by iodometric titration to calculate the production rate (mol/h) of chlorine. The conversion of hydrogen chloride was calculated from the production rate of chlorine and the above supply rate of hydrogen chloride according to the following equation, resulting in 16.4%.

Conversion (%) of hydrogen chloride=[production rate (mol/h) of chlorine×2÷supply rate (mol/h) of hydrogen chloride]×100.

(c) Production of Chlorine

The Catalyst-1 prepared in the above (a-1), the Catalyst-2 prepared in the above (a-2), and the Catalyst-3 prepared in the above (a-3) were filled up in a shell and tube type heat exchanger reactor toward the direction of from the inlet side to the outlet side in a proportion of Catalyst-1/Catalyst-2/Catalyst-3=13/36/51 (by weight), and oxidation of hydrogen chloride was continuously performed for 14600 hours by supplying a raw material gas containing 66 mol % of hydrogen chloride gas and 29 mol % of oxygen gas under heating at about 200° C. During the reaction, the conversion of hydrogen chloride was maintained in about from 80 to 90% (about 85% in average) by gradually raising the temperature of a heating medium at the shell side from 260° C. (at the beginning of the reaction) to 364° C. (at the end of the reaction) according to deterioration of the catalyst.

(d) Evaluation of Used Catalyst-3

The Catalyst-3 after being used in the above (c) was evaluated in a manner similar to the above (b), and as a result, the conversion of hydrogen chloride was found to be 8.6%.

(e) Recovery of Ruthenium Chloride From Used Catalyst-3

The Catalyst-3 (containing ruthenium in 3.2%) after being used in the above (c) was ground to 150 μm or less, calcined in an electric muffle furnace in air at 200° C. for one hour, allowed to stand for cooling, and taken out. This calcined solid was reduced with being kept in a hydrogen gas stream at 450° C. for one hour, allowed to stand for cooling under a hydrogen atmosphere, and then taken out at 100° C. or less under an atmospheric pressure after substitution of hydrogen gas by nitrogen gas. To 10 parts of this reduced solid was added a mixture of 26.7 parts of aqueous sodium hypochlorite solution having an effective chlorine concentration of 12.5%, and 3.3 parts of 25% aqueous sodium hydroxide solution, and the mixture was maintained at 70° C. for one hour under stirring. After cooling the mixture, it was filtered and a chlorine gas was blown into the mixed solution of the filtrate under heating, so that ruthenium was oxidatively evaporated, permitting it to be absorbed into hydrochloric acid, and then this solution was concentrated to dryness to obtain ruthenium chloride hydrate. The impurities contained in the obtained ruthenium chloride hydrate was quantified by inductively coupled plasma (ICP) spectrometry, and the weight ratio relative to the ruthenium resulted in that sodium was 38 ppm, magnesium was 5 ppm, calcium was 25 ppm, iron was 5 ppm [aluminum, silicon, copper, zinc, rhodium, palladium, iridium, platinum, gold were of less than detection limit value (2 ppm)].

(f) Repreparation of Catalyst

Twenty gram (20.0 g) of a carrier comprising a mixture of titanium oxide and α-alumina prepared in the same manner as in the above (a-3) was impregnated with 1.579 g of an aqueous solution of ruthenium chloride hydrate (ruthenium content: 40.1%) recovered in the above (e), dried, and calcined in air at 250° C. for 2 hours to obtain supported ruthenium oxide wherein ruthenium oxide was supported on the above carrier in a supporting rate of 4%.

(g) Evaluation of Reprepared Catalyst

The supported ruthenium oxide reprepared in the above (f) was evaluated in a manner similar to the above (b), and as a result, the conversion rate of hydrogen chloride was found to be 18.1%.

INDUSTRIAL APPLICABILITY

According to the present invention, supported ruthenium can be produced at low cost, and chlorine can be produced at low cost by using the thus obtained supported ruthenium as a catalyst.

The invention claimed is:

1. A process for producing supported ruthenium, comprising oxidizing hydrogen chloride with oxygen in the presence of supported ruthenium to produce chlorine, recovering a ruthenium compound from the supported ruthenium used as a catalyst in production of chlorine by oxidation of hydrogen chloride with oxygen, supporting the ruthenium compound on a carrier, and calcining the resulting supported ruthenium compound under an atmosphere of an oxygen containing gas, wherein the supported ruthenium is a supported ruthenium oxide, the carrier comprises titanium oxide having rutile crystal structure, and the ruthenium compound is ruthenium chloride, and wherein the recovering of ruthenium chloride comprises the steps of:

reducing the supported ruthenium compound to convert the ruthenium compound to metallic ruthenium, eluting the metallic ruthenium as an alkali ruthenate in an alkali solution containing a chlorine gas or an oxidative chlorine compound, blowing chlorine gas into the ruthenate solution under heating to oxidatively evaporate the ruthenium, absorbing the evaporated ruthenium in hydrochloric acid, and concentrating the solution to dryness to obtain ruthenium chloride.

2. A process for producing chlorine, comprising producing supported ruthenium by the process according to claim 1, and oxidizing hydrogen chloride with oxygen in the presence of the supported ruthenium.

3. The process according to claim 1 or 2, wherein the reducing is conducted in a hydrogen gas stream.

* * * * *